July 21, 1942. A. F. HICKMAN 2,290,181
TANDEM AXLE SUSPENSION
Original Filed March 16, 1937 4 Sheets-Sheet 1
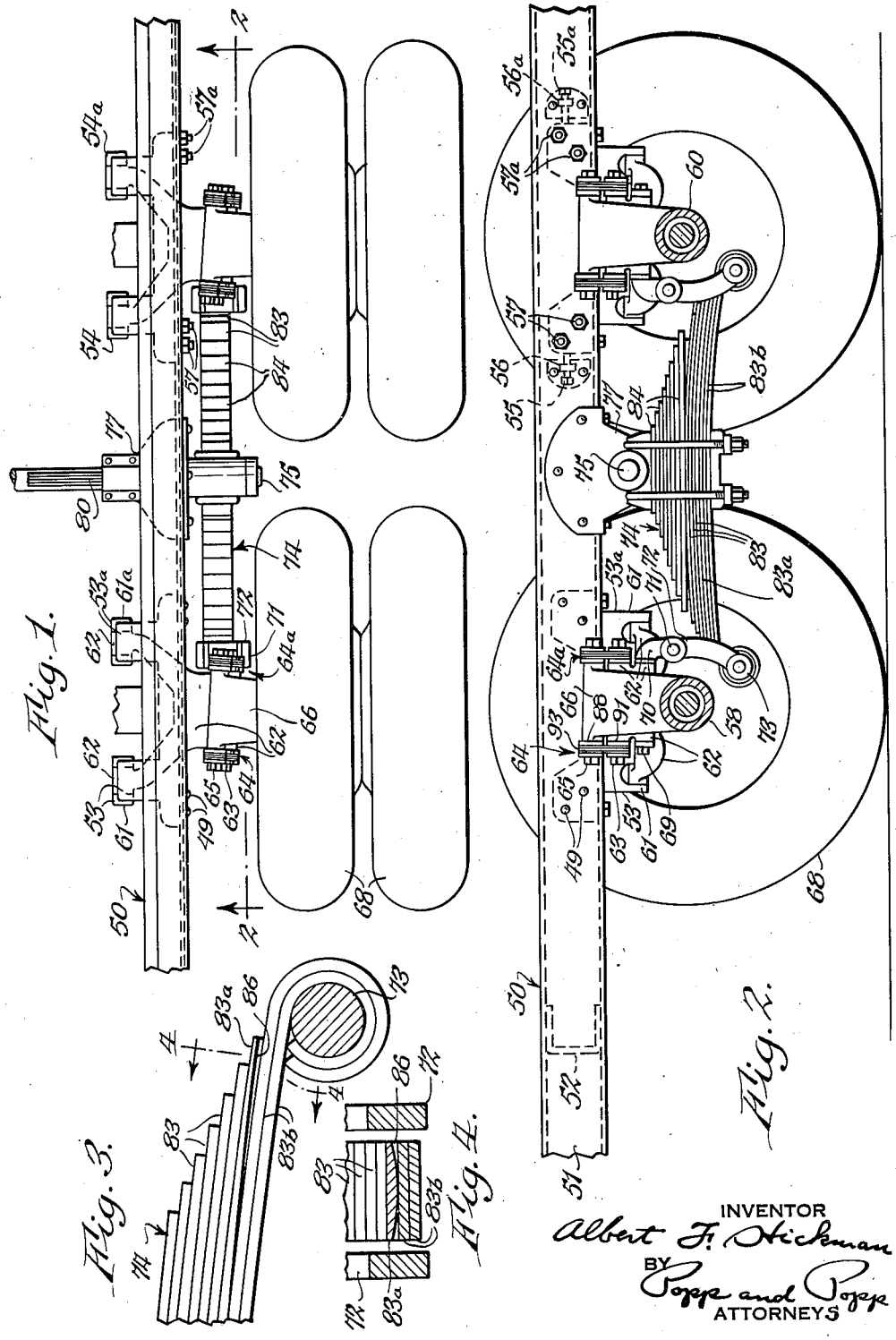
INVENTOR
Albert F. Hickman
BY
Popp and Popp
ATTORNEYS

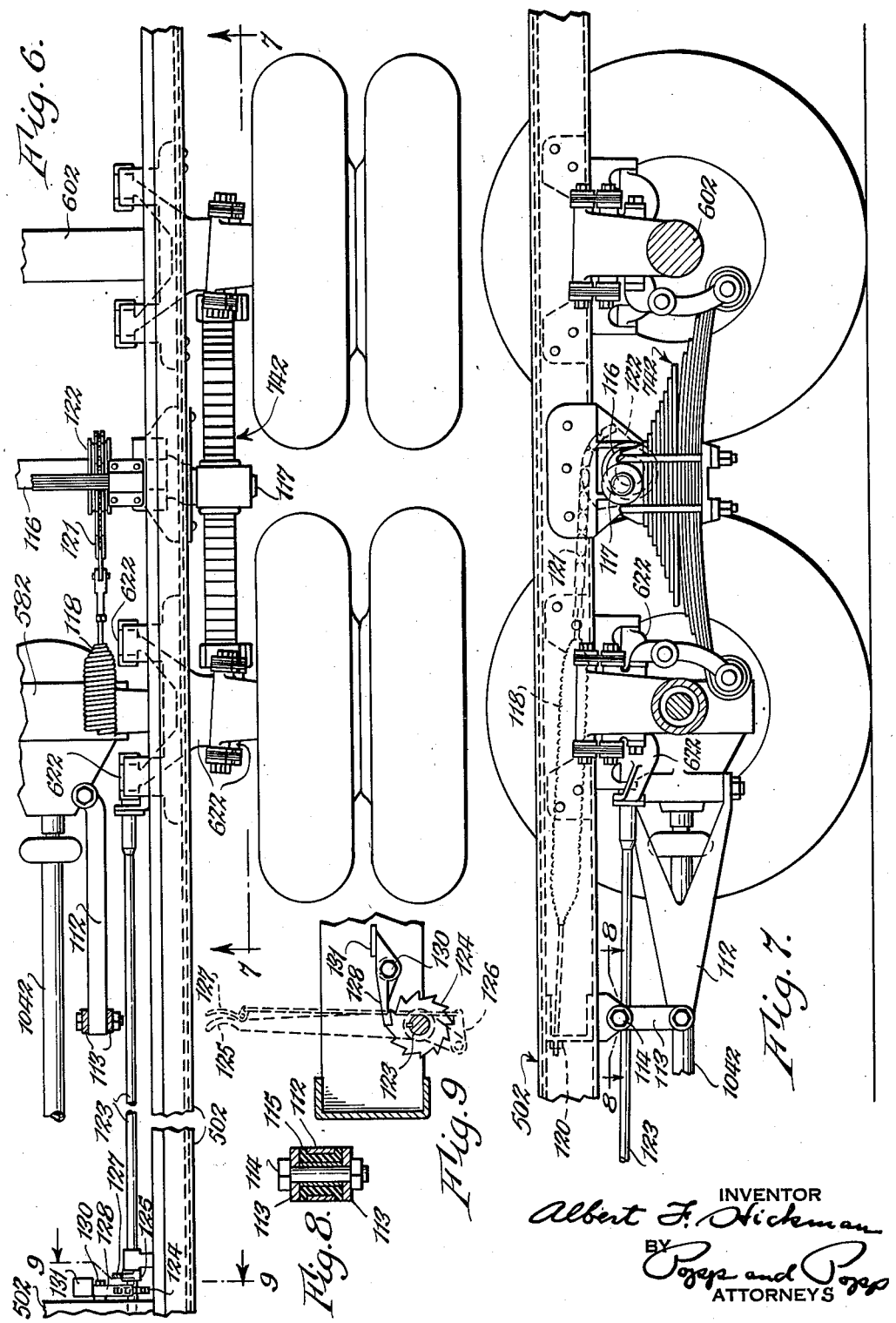

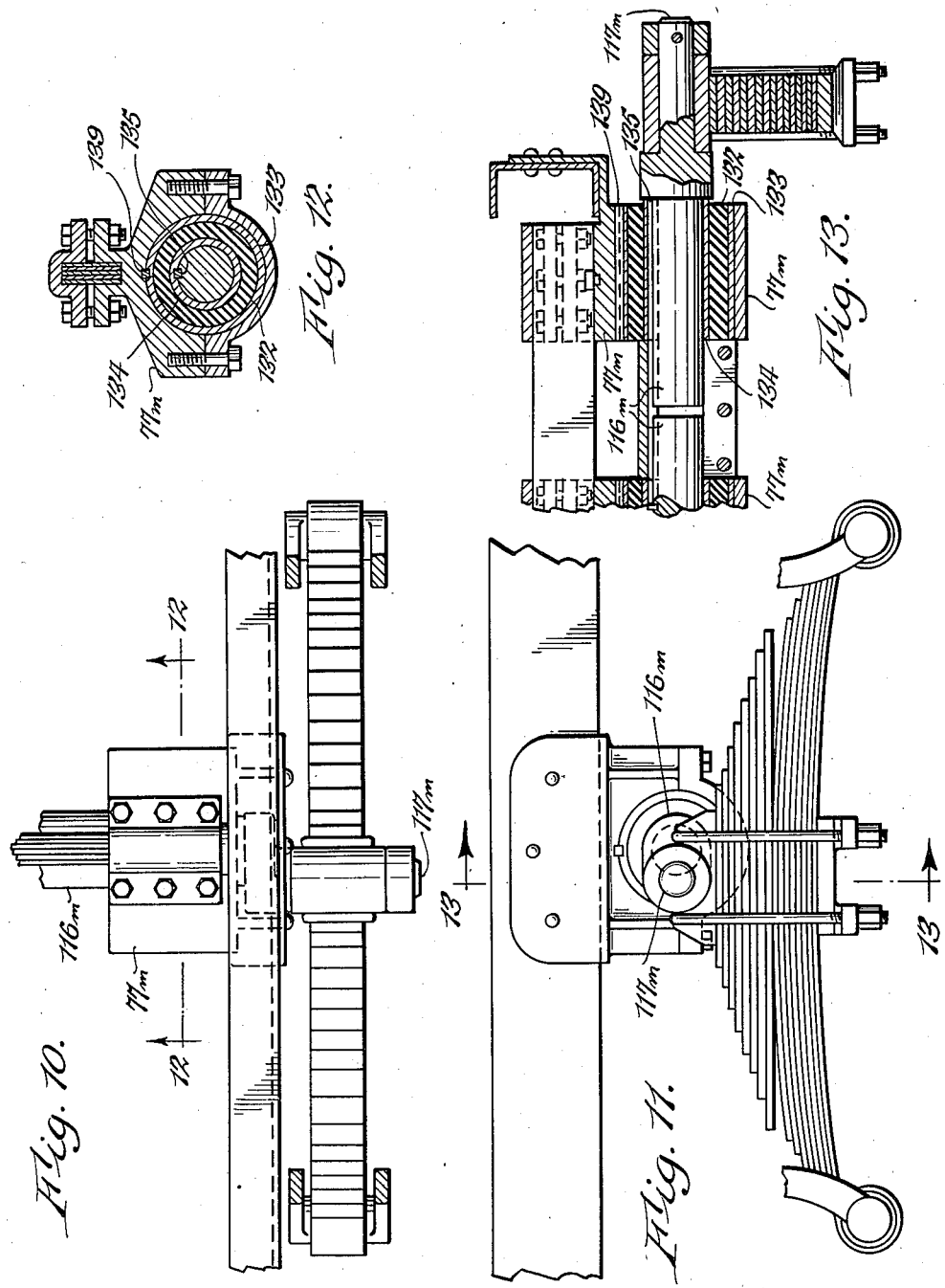

Patented July 21, 1942

2,290,181

UNITED STATES PATENT OFFICE 2,290,181

TANDEM AXLE SUSPENSION

Albert F. Hickman, Eden, N. Y., assignor to Hickman Pneumatic Seat Co. Inc., Eden, N. Y., a corporation of New York Original application March 16, 1937, Serial No. 131,193, now Patent No. 2,198,616, dated April 30, 1940. Divided and this application February 15, 1940, Serial No. 319,097

20 Claims. (Cl. 280—124)

This invention relates to a vehicle spring suspension, and more particularly to a type of spring suspension for multiple axles in which each axle is permitted to move against a geometric resilient resistance, both laterally and longitudinally, relatively to the vehicle frame, both when the vehicle has a low percentage of load variation and also when it has a high percentage of load variation.

This application is a division of my copending application Serial No. 131,193, filed March 16, 1937, for Vehicle spring suspension, now Patent No. 2,198,616, dated April 30, 1940, and is more particularly directed to the suspension of multiple axles as illustrated in Figs. 1–5, and 20–27 of said parent application.

The objects of the invention are—

1. To reduce lateral impacts from the axles against either the frame or the springs on a vehicle having either a high or a low percentage of load variation.

2. To provide a tandem axle spring suspension in which one or both of the tandem axles are self steering so that said tandem axles are automatically caused to travel parallel to each other when the vehicle is moving straight ahead.

3. To provide a tandem axle spring suspension in which one or both of the tandem axles are self steering so that, when rounding a curve, said tandem axles are caused to assume such an angle relatively to each other as will enable a pure rolling action to be attained and thereby reduce tire scuff and increase tire and gasoline mileage.

4. To accomplish all of the foregoing and, at the same time, permit a certain amount of rearward wheel movement whenever either wheel moves upwardly, and a corresponding certain amount of forward wheel movement whenever said wheel moves downwardly.

5. To accomplish the foregoing whenever both wheels of an axle are either elevated or depressed.

6. To accomplish these results in ample measure without imposing undue end thrusts on the various pivotal connections which connect the axles to the frame.

7. To accomplish all of the foregoing results even though the necessary resilient force be obtained from a spring which acts in a single plane and has an arithmetic rate of resilient resistance.

8. To enable the outer eye of a laminated spring to be twisted to a small extent without being opposed by an undue amount of resistance by said spring and, at the same time, without necessitating any expensive ball and socket joint to take care of this twisting action.

9. To provide a leaf spring which will provide a smooth geometric rate of resistance against flexure and not be noisy in action.

10. To provide a tandem axle spring suspension in which each of the tandem axles may be resiliently supported by a leaf spring in such manner as to take care of a high percentage of load variation and yet be so arranged as to not impose excessive rotative torques or thrusts upon said spring.

11. To provide a tandem axle spring suspension in which movement of either one or both of the axles are, at the same time, opposed by a geometric resilient resistance and, in which either one or both of said axles are independently opposed by a total resilient force of such nature as to take care of a high percentage of load variation.

12. To provide a vehicle spring suspension in which a geometric resilient resistance is obtained in a manner which is very compact and requires no lubrication whatsoever.

13. To enable the one end of a vehicle which has the greatest variation in loads to directly bear the major part of the twisting moments resulting from such loads and at the same time, to transmit a sufficient portion of the twisting moments of such loads to the other end of the vehicle to substantially eliminate frame twisting by imposing a substantially equal twisting force upon both ends of the frame.

14. To provide a spring suspension having a leaf spring in which all of the metal is substantially equally stressed, whereby the effective life of the spring is lengthened because of not imposing on only a few of the leaves the major portion of the fatigue stresses.

15. To effect the result just mentioned without liability of at any time overstressing any of the metal of any of the spring leaves beyond the fatigue limit.

Numerous other collateral objects of the invention and practical solutions thereof are disclosed in detail in the herein patent specification wherein:

In the accompanying drawings:

Fig. 1 is a fragmentary top plan of a tandem axle form of my invention.

Fig. 2 is a vertical, longitudinal section thereof, taken on line 2—2, Fig. 1.

Fig. 3 is an enlarged, fragmentary, side elevation of the rear end of the semi-elliptic spring of Figs. 1 and 2.

Fig. 4 is an enlarged, vertical, transverse section thereof, taken on line 4—4, Fig. 3.

Fig. 6 is a fragmentary top plan of a tandem axle provided with my invention having the semi-elliptic leaf springs mounted on a crank shaft.

Fig. 7 is a vertical, longitudinal section thereof, taken on line 7—7, Fig. 6.

Fig. 8 is an enlarged, horizontal section through the upper end of the torque arm shackle of Figs. 6 and 7, taken on line 8—8, Fig. 7.

Fig. 9 is an enlarged, vertical, transverse section through the vehicle frame showing the means of adjusting the tension in the transferring, torsion bar of Figs. 6, 7, taken on line 9—9, Fig. 6.

Fig. 10 is a fragmentary, top plan of a tandem axle spring suspension having a modified means of resiliently restraining rotation of its crank shaft.

Fig. 11 is a fragmentary, side elevation thereof.

Fig. 12 is a vertical, transverse section through the crank shaft and associated parts of Figs. 10 and 11, taken on line 12—12, Fig. 10.

Fig. 13 is a vertical, longitudinal section through said crank shaft and associated parts, taken on line 13—13, Fig. 11.

Similar characters of reference indicate like parts in the several figures of the drawings.

Figure 5:
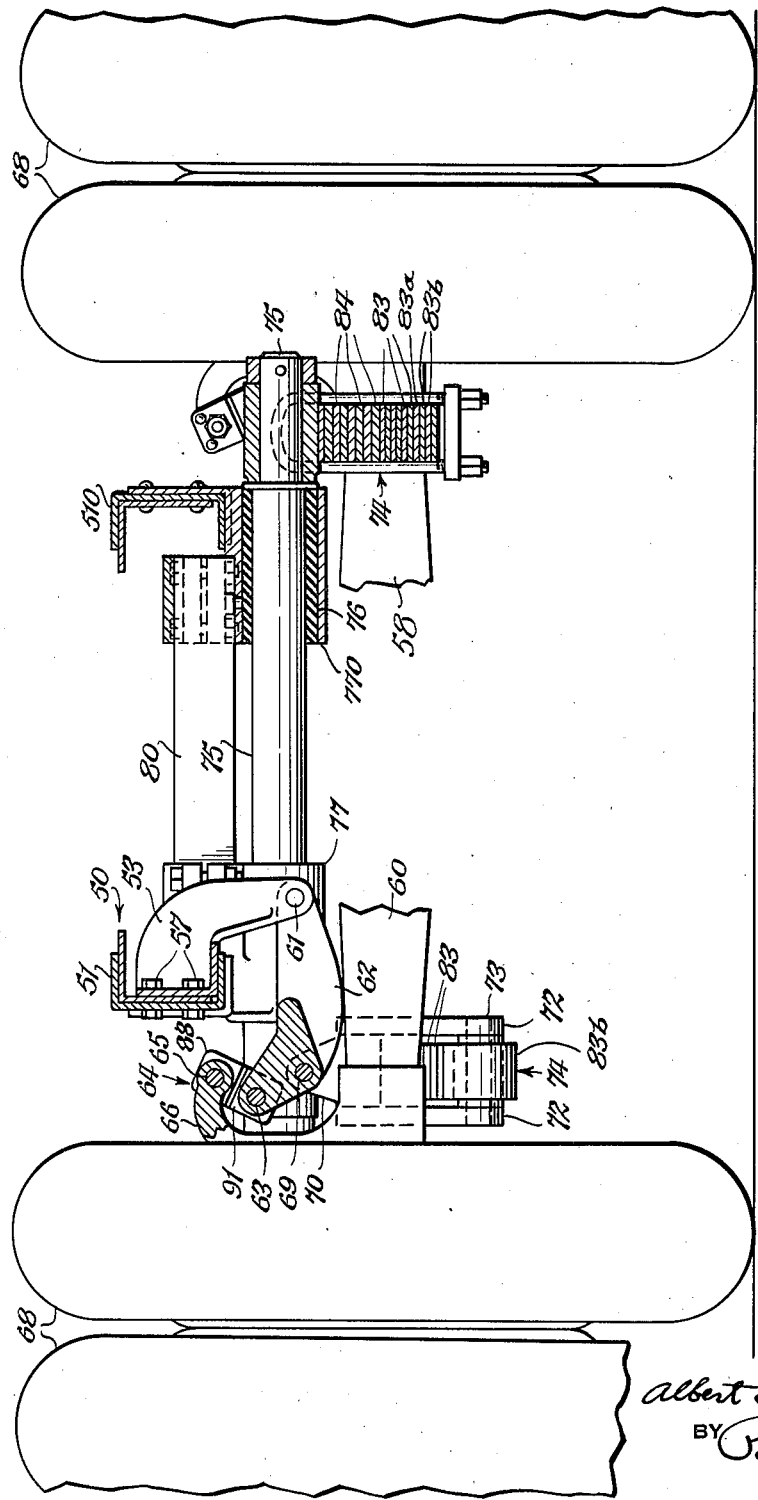
Fig. 5 is a rear elevation, with parts in section, of the construction of Figs. 1-4.

Confining our attention for the present to Figs. 1-5, the vehicle chassis consists of the usual rectangular frame 50 consisting of a pair of longitudinal frame bars 51, 510 suitably joined together transversely by a plurality of cross frame bars 52 in the usual and well known manner. Frequently, in modern practice, the imposed loads are transmitted directly from the vehicle spring suspension to the body in which case the "frame" is little more than a template, but this question is of no importance here and need only be mentioned in passing to prevent any impression that the present invention requires such a relatively heavy frame as that shown.

Secured by rivets 49 or otherwise to the inner face of each frame bar is a pair of downwardly projecting front, bifurcated brackets 53, 53a (see Fig. 5). Arranged on said frame bar rearwardly of said front brackets are a pair of similar, downwardly projecting, rear, bifurcated brackets 54, 54a. These rear brackets are longitudinally adjustable, relatively to their companion frame bar 51 or 510, by means of adjusting screws 55, 55a which are threaded in suitable angle plates 56, 56a secured to inner vertical faces of the web of their companion frame bar.

When the proper adjustment of these rear brackets 54, 54a has been suitably effected, the same are locked in position by fore and aft pairs of clamping bolts 57, 57a, it being understood that the holes in either the frame bars 51, 510 or the holes in the rear brackets themselves are either of elongated shape or are drilled sufficiently large to permit a small amount of longitudinal movement of said rear brackets relatively to their companion frame bar.

The front brackets 53, 53a are connected to the front axle 58 in a manner identical with the connection between the rear brackets 54, 54a and the rear axle 60 and hence only the former connection will be described.

Pivoted at its inner bifurcated ends at 61, 61a to the front brackets 53, 53a is a Y-shaped lever 62. The axis of said pivots 61, 61a slopes downwardly and rearwardly, i. e., it is inclined to the horizontal but lies in a plane parallel to a vertical plane passing longitudinally through the vehicle. Each of said Y levers 62 is pivoted at its outer end on lower pivots 63 to the lower ends of a pair of resilient shackles 64, 64a which will be subsequently described in detail. These shackles slope upwardly and rearwardly from said lower pivots 63, as shown in Fig. 2, and also slope upwardly and inwardly from said pivots 63, as shown in Fig. 5, and are pivotally connected at their upper ends at 65 to an axle post 66 connected with a companion front axle 58. This upward and inward inclined arrangement of said shackles tends to cause each axle to centralize itself in a direction transverse of the frame and enables the action of gravity to geometrically and resiliently resist any such movement of said axle away from its central position. This permits the vehicle body to move substantially straight ahead despite a certain amount of lateral movement of the axle. This is what I term the "lateral cushioning" of the vehicle frame relatively to one or more of the axles and is discussed at greater length in my earlier patents and patent applications. The novelty in the present construction does not lie in this "lateral cushioning," per se, but in the application of this very desirable type of cushioning to any end of a vehicle which has a high percentage of load variation, as will appear more clearly hereafter.

The oblique position of the axis of the pivots 61, 61a permits either wheel 68 to freely move a short distance rearwardly whenever said wheel rises and, concomitantly, permits said wheel to move a short distance forwardly whenever said wheels falls. This enables the peripheral speed of the wheel to be maintained substantially constant when travelling over irregularities, and at the same time, enables the axis of the wheel to receive the sudden horizontal thrusts which inevitably result as a consequence of said uniform peripheral speed, without imparting these thrusts directly to the frame. Some of these forward and backward thrusts are imposed upon the axle before its inertia enables it to rise rearwardly or wall forwardly and these longitudinal thrusts are absorbed in the present invention by the shackles 64, 64a which are so constructed as to be resilient and thereby permit a limited amount of horizontal, longitudinal axle movement even in the absence of vertical movement of the axle such as occurs in practice when the irregularity is entirely absorbed by the tire.

The axes at the upper and lower ends of the shackles are also disposed at an acute angle with respect to a vertical plane positioned transversely of the vehicle. This angularity, in combination with the upward, inward slope of the shackles, renders each of the rear axles independently self steering, as will be explained hereinafter.

Pivoted horizontally and longitudinally of the vehicle at 69 at the outer lower part of each lever 62 is a rocking head 70 provided with a downwardly projecting arm. The latter is pivoted horizontally and transversely at 71 to the upper end of a link 72 whose lower end, in turn, is horizontally and transversely pivoted at 73 to the companion end of a companion, semi-elliptic, laminated or leaf compensating spring 74.

The central, thick part of said semi-elliptic compensating spring 74 is pivoted on a cross shaft 75 which is journaled horizontally and transversely of the vehicle in rubber cushions 76 arranged in companion cushion brackets 77, 770. It is to be understood that the cross shaft 75 does not rotate to any appreciable extent in these cushion brackets 77, 770, but only that the rubber cushions which are arranged between said brackets 77, 770 and said cross shaft 75 permit the latter to flex freely without any metallic, positive hinderance and thereby permit such frame weaving as is bound to occur in actual practice, particularly in heavy trucks. These rubber cushions 76 also deaden such noises as would occur if the two metallic members involved were in direct contact with each other and were, in addition, able to move relatively to each other. It is true that the present invention employs the form of laminated cross bar 80 which has been explained in detail in my Patent No. 2,087,255, dated July 20, 1937, for Vehicle spring suspension, but it is to be remembered that this cross bar 80 only controls the distance between the cushion brackets 77, 770 and not their angular position relatively to each other.

As shown in Fig. 2, the lower eight leaves 83 of the semi-elliptic spring 74 are all very thin and are of equal thickness. The upper leaves 84 of said spring are, on the other hand, relatively thick and are also of equal thickness, but this thickness is larger than the thickness of the lower leaves 83. Furthermore, the upper, thick spring leaves 84 are relatively straight whereas the lower thin leaves are all provided with a certain amount of camber. The action of such a "compound," semi-elliptic spring is to provide a geometric rate of resistance in which the resistances to initial movement are progressively greater but very small in amount whereas resistances to increasing movement are progressively greater and relatively large in amount. In addition to this the construction of this leaf spring 74 is such that the normal life of all of its leaves is the same. This result is obtained by so proportioning the size and the shape of the lower leaves 83 as to have a proper fatigue strength based upon the very high total number of stress fluctuations to which they are subjected during their total life. The upper, thick leaves 84 are also so proportioned as to have a proper fatigue strength based on their total number of stress fluctuations but this latter number is relatively so low that these upper spring leaves may be considered as subjected to merely static loads and hence the allowable stress may be much higher than with the thin leaves 83.

As far as pure stress in the different leaves is concerned, such a differential in stress could be obtained by relatively minor changes in a conventional laminated spring. But another factor is involved, namely that the spring provides a geometric rate of resilient resistance with a very "flat" curve at normal loadings and a very rapid change to a "steep" curve at higher loadings. Applicant's spring attains both of these results simultaneously by having each infinitesimal portion of steel in each spring leaf stressed in accordance with its particular fatigue strength as encountered in actual service and, at the same time, by having the spring so arranged, as a unitary whole, as to be very soft for increments of load slightly greater than its normal load and rapidly increasingly stiff for increments of load considerably different from its normal load.

When one end only of either the forward axle 58 or the trailing axle 60 is raised or lowered, a certain amount of undesirable twisting strain is imposed upon the semi-elliptic spring, and the latter naturally opposes such a twisting movement and thus renders the spring suspension unnecessarily stiff as to this particular movement. Figs. 3 and 4 illustrate how applicant has arranged the present invention as to reduce such twisting strains on the spring leaves as a consequence of such an axle movement and has, concomitantly, enabled one or both of said axles to move more very freely and easily under such conditions. Applicant has obtained this effect by taper grinding the outer undersides 86 of that particular lowermost spring leaf 83a which is not connected to the pivots 73 at the lower ends of the links 72. Thus the two lower thin leaves 83b which are connected directly to the lower ends of the links 72 are thus enabled to twist slightly, when the one end only of either axle rises or falls, without requiring that the spring leaf 83a and all of the spring leaves above the same be also twisted or tilted. This taper grinding of the third-from-the-bottom spring leaf 83a does not materially affect its strength or flexure characteristics because said grinding causes the outer ends of said leaf to be of substantially, equal-strength, cantilever form. In other words, this removal of metal at the ends of said spring leaf 83a has no material effect on its resilience or its stress characteristics and only an insignificant effect on its inertia and momentum, but does enable the leaf spring as a whole to be more easily twisted.

It will be noted in Figs. 1 and 2 that the resilient strips 93 are shown as normally disposed in a plane which is perpendicular of the axes of the pivots 65 and 63. To effect such a result it is, of course, necessary to so form the resilient strips 93 that they have an initial curvature prior to being installed in the vehicle. This is deemed to be the preferred arrangement in that it reduces the end thrusts on said pivots 65 and 63 but the present invention is not confined to such a normally perpendicular positioning of the shackles because, particularly in light and/or inexpensive vehicles, the resilient strips 93 may be normally arranged in a plane which is vertical and disposed transversely of the vehicle. In such case the shackles may be manufactured symmetrically without providing any initial flexure in the resilient strips 93.

It is to be noted, in this form of the invention, that the starting and brake torque of the tandem axles is not transferred to the semi-elliptic springs 74 but is carried directly through the shackles 64, 64a and Y arms 62 to the frame. This permits the springs to carry the vertical loads only and do not have to be made heavy enough to carry momentary torque loads and hence do not have to be made so heavy as to interfere with their resilient characteristics in normal operation. It is also of great significance in the present invention that said semi-elliptic springs are not forced to carry any transverse loads which in actual practice are very heavy, and are imposed upon only those leaves of the ordinary, semi-elliptic spring suspension which are connected to the spring eyes 73. Also it is because of the fact that, in the present invention, the semi-elliptic springs 74 only carry the vertical loads, that their central bearings on the cross shaft 65 may be constructed very light and the cross shaft itself very light and the latter mounted in such rubber cushions as those shown in Fig. 5, as would absolutely be unfeasible in a spring which is forced to carry torque and/or transverse loads. It is true that, in the present invention, the lowermost of the thin spring leaves 83 are subjected to twist, but this is only because of the arcuate movement of the pivot 69 about the fulcrum 61, 61a and this arcuate movement is very small and does not constitute a direct lateral thrust on said spring leaves and the strains that are imposed are very considerably reduced by the tapered shape 86 of the third-from-the-bottom leaf 83a.

The pivots 61, 61a of the levers 62 incline to the horizontal, as previously described, to enable each wheel to move slightly rearwardly when it rises, and, conversely, to move slightly forwardly when it descends, so as to enable the horizontal component of the wheel axis movement to remain substantially constant, even though its peripheral speed is substantially constant but is travelling over a rough road.

In addition to this, the pivots 65 and 63 of the shackles 64, 64a are inclined with respect to a vertical plane positioned transversely of the vehicle. The reason for this angularity is as follows:

When the vehicle is travelling straight ahead, if the tandem axles 58, 60 are not parallel for any reason, they will automatically assume a parallel position because of the fact that any rear axle which is out of line will tend to follow a horizontal arc and this tendency, due to the lateral friction between the tires and the roadway, will cause a lateral movement of the axle relatively to the frame. Due to the fact that the shackles normally extend upwardly and inwardly, as shown in Fig. 5 and due to the further aforesaid angularity of the shackle pivots with respect to a vertical, transverse plane, this lateral movement is automatically caused to be translated into a slight turning movement of the whole axle, and this turning movement will continue until both of the rear axles are in line with each other. Such a movement, naturally, causes a change in the angularity of the shackles at the opposite ends of each axle and this change is resisted by gravity which, due to the obliquity of the shackles, is caused to act in a geometric manner. It is obvious that this self-steering movement should be as small as possible because of this gravitational resistance to lateral axle movement, and it is for this reason that the position of the rear axle in a horizontal plane is rendered adjustable by the adjusting screws 55, 55a and clamping bolts 57, 57a, so as to reduce as much as possible the need for this self-steering. This adjustment permits the rear axle 60 to be properly aligned in the assembly room at the time of manufacture and also permits said axle to be brought back to alignment if frame distortion has occurred in use, as is very frequently the case.

The fact that the rear axles 58, 60 "trail" each other also occurs when the vehicle is making a turn on the road. In this case, just as when going straight ahead, the tires naturally tend to resist lateral scuffing and tend to push the axle laterally and, as a consequence, the whole axle moves obliquely to eliminate this scuffing. Thus when the vehicle is making a turn the two rear axles are caused to automatically move to such an oblique position, relatively to each other, as will cause their axes to intersect the axes of revolution of the two front wheels and will enable the vehicle to make the turn without tire scuffing. This action occurs when either the vehicle is steered around a long turn in the road or if it is steered sharply on a straight road, as, for instance, when overtaking a slow vehicle ahead, or otherwise avoiding some obstruction or other. It is to be understood that this action also takes place to some extent when a tendency to tire scuffing occurs because of one wheel or a pair of wheels at one end of an axle having a diameter different from the diameter of the wheel or pair of wheels at the other end of the same axle.

In the tandem axle construction illustrated in Fig. 6—9, the front axle 582 is driven by the propeller shaft 1042 while the rear axle 602 is not power driven but is merely a trailing axle, this construction being particularly adapted for lighter and less expensive vehicles. Because all of the starting torque is imposed upon the drive axle 582, the latter is preferably (though not necessarily) provided with a conventional form of torque arm 112 whose front end is connected to the lower end of a torque link 113. This eliminates the need of a special, stronger connection between the drive axle 582 and the frame, than that used between the trailing axle 602 and the frame. The upper end of the torque link 113 is pivoted at 114 to the vehicle frame and, because of the fact that the drive axle must be free to tilt freely in a plane which is vertical and transverse of the vehicle, the upper end of said torque link is connected through a resilient rubber or other similar connection 115 to the main frame of the vehicle.

In this form of the invention is shown a modified means of connecting the central part of the semi-elliptic spring 742 with the vehicle frame. Journaled horizontally and transversely on the main frame 502 is a two-piece crank shaft 116 having crank pins 117 at its outer ends. Rotation of this crank shaft 116 is resiliently restrained in any desired manner, for instance by the helical spring 118 which is connected at its front end at 120 to the main frame of the vehicle and is connected at its rear end to a chain belt 121 which is wrapped around a smooth-faced, flanged segment 122 which is suitably secured to the crank shaft 116.

Journaled intermediate its ends upon each of said crank pins 117 is a semi-elliptic, leaf spring 742. Each crank pin 117 may be located exactly midway of the ends of its companion leaf spring 742, as shown, so as to obtain a certain distribution of load on the two rear axles 582, 602, or said crank pin may be either adjustably or fixedly located any desired distance forwardly of this central position so as to increase the proportion of load on the drive axle 582 as compared with the load on the trailing rear axle 602. It should be noted, in passing, that when the crank pins 117 are exactly midway of the ends of their companion leaf springs 742, the load distribution is not 50–50, as will be shortly explained.

It is obvious that the construction of Figs. 1–5 could be equipped with this crank shaft 116, if desired.

The rear end of a truck is subjected to very heavy pressures, and these pressures are practically always laterally unbalanced when the truck is in motion. The percentage of the effective unbalance is usually rather low, particularly when the truck is heavily loaded and travelling at a relatively high speed, but nevertheless causes a tendency to tilt the rear end of the vehicle frame in a vertical transverse plane. If none of this tilting effect is transferred to the front end of the truck the result is that the entire truck frame is twisted, as is well known in actual practice. On the other hand, if a large portion of the resilient forces at the rear end of a truck were transferred to its front end, the effective force at the front would be the difference of the pressures at the rear end of the truck and this would cause the front end to heel over in the correct direction but altogether excessively in amount. Also the mechanism for transferring such heavy stresses from the rear to the front of the truck would be very heavy and costly.

In the construction of Figs. 6–9 is shown a means whereby a sufficient portion of the forces which cause tilting at the rear end of the vehicle are transferred to the front end of the vehicle, so as to eliminate all twisting strains, as far as tilting forces originating at the rear end of the vehicle are concerned, by causing the frame to tilt an equal amount at the front and back ends. This means consists primarily of a pair of torsion rods 123 each of whose front ends is adjustably secured through a ratchet wheel 124 to the front end of the vehicle frame, while its rear end is secured to the companion, Y shaped lever 622 of the front tandem axle or driving axle 582. Hence, as the one or other of said Y levers 622 moves up or down, this movement is translated into a torsional strain which is carried to the front end of the vehicle frame which latter is then tilted in the one or other direction in accordance with the tilt at the rear end of the vehicle. This eliminates any twisting frame stress as far as any tilting which may originate at the rear end of the vehicle is concerned.

The amount of the torsional strain thus transferred to the front end of the vehicle is, of course, a function of the diameter, length and metal of the torsion rod and this is properly designed to take care of such stresses as result from maximum loading. It is well known, however, that the variation of load on a truck is considerable, and hence provision has been made in the present invention whereby the amount of stress transferred may be adjusted if desired. This consists of a regulating handle 125 whose hub is journaled on the front end of its companion torsion rod 123 and carries the usual spring actuated dog 126 which may be tripped in the usual manner by a trip lever 127. A suitable pedal actuated pawl 128 is also provided to restrain the ratchet wheel 124 from rotating relatively to the vehicle frame, the same being pivoted at 130 on the vehicle frame and having a treadle plate 131 at its inner end adapted to be depressed by the foot of the vehicle operator.

While the primary purpose of adjusting the effective torsion of the torsion rods 123 is to eliminate frame twisting, it should also be noted that in an emergency, the same may be used to impose a much heavier than usual downward force on the drive axle 582 and thereby supply the same with the required greater driving traction.

The use of torsion rods 123 lends itself particularly well to the construction of Figs. 6–9 in that it imposes an additional resilient pressure on the front axle 582 and hence provides a load distribution which is not 50–50 even though the leaf springs 742 are constructed symmetrically with the crank pins 117 journaled exactly midway of their ends. It is to be understood, however, that such a pair of torsion rods may also be used in the construction of Figs. 1–5, but as the load distribution in such a dual-drive, tandem axle construction is preferably always 50–50, it is preferred in that case that the strain to which the torsion rods are subjected be derived from only the front axle but that the semi-elliptic spring be unsymmetrical to preserve the 50–50 load distribution.

The tandem axle construction of Figs. 10–13 shows a means of eliminating the helical spring 118 of Figs. 6–9. This result is obtained by employing a rubber sleeve 132 intermediate each end of the two-piece crank shaft 116m and its companion frame bracket 77m. It is to be understood that, in the position of the parts shown in the drawings, each of the rubber sleeves is under torsional strain tending to turn the crank shaft in a counterclockwise direction, as seen in Fig. 11, and hence resiliently resisting upward movement of the crank pins 117m.

To enable the resilient rubber sleeves 132 to be readily replaced after a certain period of use, each of the same is preferably cemented to an outer metal tube 133 and an inner metal tube 134, the latter being connected to the companion end of the crank shaft 116m by a key 135, and the former being connected to its companion bracket 77m by a key 139.

I claim as my invention:

1. A tandem axle vehicle spring suspension comprising: a frame; two axles each having wheels journaled thereon; a lever fulcrumed on said frame adjacent each end of each of said axles and normally extending outwardly beyond said frame; means pivotally connected to each of said levers and pivotally connected to the corresponding end of the companion axle at a point normally above said pivotal connection with said lever and permitting movement of each of said axles in a direction laterally of said frame; a resilient compensating means rotatably secured intermediate its ends to said frame at each side thereof adjacent said axles; and means movably connecting the opposite ends of each of said resilient compensating means with the adjacent ends of said axles whereby the load on said body is transmitted through said resilient compensating means to said axles.

2. A tandem axle spring suspension comprising: a frame; two axles; each having wheels journaled thereon; a lever fulcrumed on said frame adjacent each side thereof and adjacent each end of each of said axles and normally extending in a generally horizontal direction; a shackle connecting the outer part of each of said levers with the corresponding end of the companion axle, each of said shackles extending upwardly and inwardly from the corresponding lever; a resilient compensating means rotatably secured intermediate its ends to said frame at each side thereof adjacent said axles; and means movably connecting the opposite ends of each of said resilient compensating means with the adjacent ends of said axles whereby the load on said body is transmitted through said resilient compensating means to said axles.

3. A tandem axle vehicle spring suspension comprising: a frame; two axles each having wheels journaled thereon; a lever fulcrumed on said frame adjacent each end of each of said axles and normally extending in a generally horizontal direction; means pivotally connected to each of said levers and pivotally connected to the corresponding end of the companion axle, the axes of said pivotal connections being angularly disposed relative to the straight line of movement of the vehicle; a resilient compensating means rotatably secured intermediate its ends to said frame at each side thereof adjacent said axles; and means movably connecting the opposite ends of each of said resilient compensating means with the adjacent ends of said axles whereby the load on said body is transmitted through said resilient compensating means to said axles.

4. A tandem axle vehicle spring suspension comprising: a frame; two axles each having wheels journaled thereon; a lever fulcrumed on said frame adjacent each end of each of said axles and normally extending in a generally horizontal direction; means pivotally connected to each of said levers and pivotally connected to the corresponding end of the companion axle, the axes of said pivotal connections being angularly disposed in a horizontal direction relative to the straight line of movement of the vehicle; a resilient compensating means rotatably secured intermediate its ends to said frame at each side thereof adjacent said axles; and means movably connecting the opposite ends of each of said resilient compensating means with the adjacent ends of said axles whereby the load on said body is transmitted through said resilient compensating means to said axles.

5. A tandem axle vehicle spring suspension comprising: a frame; two axles each having wheels journaled thereon; a lever fulcrumed on said frame adjacent each end of each of said axles and normally extending in a generally horizontal direction; means pivotally connected to each of said levers and pivotally connected to the corresponding end of the companion axle, the axes of said pivotal connections being angularly disposed in a vertical direction relative to the surface of the roadway being traversed by the vehicle; a resilient compensating means rotatably secured intermediate its ends to said frame at each side thereof adjacent said axles; and means movably connecting the opposite ends of each of said resilient compensating means with the adjacent ends of said axles whereby the load on said body is transmitted through said resilient compensating means to said axles.

6. A tandem axle vehicle spring suspension comprising: a frame; two axles each having wheels journaled thereon; a lever fulcrumed on said frame adjacent each end of each of said axles and normally extending in a generally horizontal direction, the axis of each of said fulcrums lying in a vertical plane parallel to the straight line of movement of the vehicle; means pivotally connected to each of said levers and pivotally connected to the corresponding end of the companion axle, the axes of said pivotal connections being angularly disposed relative to the axis of the fulcrum of the corresponding lever; a resilient compensating means rotatably secured intermediate its ends to said frame at each side thereof adjacent said axles; and means movably connecting the opposite ends of each of said resilient compensating means with the adjacent ends of said axles whereby the load on said body is transmitted through said resilient compensating means to said axles.

7. A tandem axle vehicle spring suspension comprising: a frame; two axles each having wheels journaled thereon; a lever fulcrumed on said frame adjacent each end of each of said axles and normally extending in a generally horizontal direction, the axis of each of said fulcrums being angularly disposed in a vertical direction relative to the surface of the roadway being traversed by the vehicle; means movably connecting each of said levers with the corresponding end of the companion axle; a resilient compensating means rotatably secured intermediate its ends to said frame at each side thereof adjacent said axles; and means movably connecting the opposite ends of each of said resilient compensating means with the adjacent ends of said axles whereby the load on said body is transmitted through said resilient compensating means to said axles.

8. A tandem axle vehicle spring suspension comprising: a frame; two axles each having wheels journaled thereon; a lever fulcrumed on said frame adjacent each end of each of said axles and normally extending outwardly beyond said frame; means pivotally connected to each of said levers and pivotally connected to the corresponding end of the companion axle, the axes of said pivotal connections being disposed at a fixed angularity relative to the axis of the fulcrum of the corresponding lever; a resilient compensating means rotatably secured intermediate its ends to said frame at each side thereof adjacent said axles; and means movably connecting the opposite ends of each of said resilient compensating means with the adjacent ends of said axles whereby the load on said body is transmitted through said resilient compensating means to said axles.

9. A tandem axle vehicle spring suspension comprising: a frame; two axles each having wheels journaled thereon; a lever fulcrumed on said frame adjacent each end of each of said axles and normally extending in a generally horizontal direction; a shackle connecting each of said levers with the corresponding end of the companion axle, each of said shackles extending upwardly and inwardly from the corresponding lever; a rocking head pivotally mounted on each of said levers, the axis of the pivotal mounting of each of said rocking heads being generally parallel with the line of movement of the vehicle; a link connected at one end to each of said rocking heads and depending therefrom; a compensating spring member rotatably secured intermediate its ends to said frame at each side thereof adjacent said axles; and means movably connecting the opposite ends of each of said spring members with the adjacent ends of said axles whereby the load on said body is transmitted through said compensating spring members to said axles.

10. A tandem axle vehicle spring suspension comprising: a frame; two axles each having wheels journaled thereon; a lever fulcrumed on said frame adjacent each end of each of said axles and normally extending in a generally horizontal direction; means movably connecting each of said levers with the corresponding end of the companion axle; a crank shaft pivotally mounted on said frame and having an axially extending crank pin at each end thereof; means for resiliently restraining rotation of said crank shaft; a leaf spring rotatably mounted adjacent its center on each of said crank pins; and means movably connecting the opposite ends of each of said leaf springs with the adjacent ends of said axles whereby the load on said body is transmitted through said leaf springs to said axles.

11. A tandem axle vehicle spring suspension comprising: a frame; two axles each having wheels journaled thereon; a lever fulcrumed on said frame adjacent each end of each of said axles and normally extending in a generally horizontal direction; means movably connecting each of said levers with the corresponding end of the companion axle; a crank shaft pivotally mounted on said frame and having an axially extending crank pin at each end thereof; means operatively connecting said crank pins and said axles; a sleeve constructed of plastic material and connected with said frame and encircling a portion of said crank shaft and adapted to resiliently restrain rotation of said crank shaft; a leaf spring rotatably mounted adjacent its center on each of said crank pins; and means movably connecting the opposite ends of each of said leaf springs with the adjacent ends of said axles whereby the load on said body is transmitted through said leaf springs to said axles.

12. A tandem vehicle spring suspension comprising: a frame; two axles having wheels journaled thereon; a primary compensating spring means rotatably mounted intermediate its ends on each side of said frame; means movably connecting the opposite ends of each of said compensating spring means with the adjacent ends of said axles whereby the load on said body is transmitted through said compensating spring means to said axles; and a secondary spring means connecting said primary compensating spring means with the opposite end of said frame.

13. A tandem axle vehicle spring suspension comprising: a frame; two axles each having wheels journaled thereon; a lever fulcrumed longitudinally on said frame adjacent each end of each of said axles; a resilient compensating means rotatably secured intermediate its ends to said frame at each side therof adjacent said axles; means connecting the opposite ends of each of said resilient compensating means with the adjacent pair of said levers; means providing an unrestricted pivotal connection between each of said levers and the corresponding end of the companion axle; and means for resiliently restraining movement of said axles relative to said levers lengthwise of the vehicle.

14. A tandem axle vehicle spring suspension comprising: a frame; two axles each having wheels journaled thereon; a lever fulcrumed on said frame adjacent each end of each of said axles and normally extending in a generally horizontal direction, each of said levers comprising a pair of spaced arms; means pivotally connected to each of said levers and pivotally connected to the corresponding end of the companion axle at a point normally above said pivotal connection with said lever and permitting movement of each of said axles in a direction transverse of said frame; a resilient compensating means rotatably secured intermediate its ends to said frame at each side thereof adjacent said axles; and means movably connecting the opposite ends of each of said resilient compensating means with the adjacent pair of said levers at a point more than two-thirds the length of each lever beyond its fulcrum.

15. A tandem axle vehicle spring suspension comprising: a frame; two axles each having wheel journaled thereon; a lever arranged adjacent each end of each of said axles and normally extending in a generally horizontal direction; a plurality of bearings for each of said levers mounted on said frame, the axes of said bearings extending longitudinally of the vehicle and said plurality of bearings being spaced a substantial distance from one another longitudinally of the vehicle; means pivotally connected to each of said levers and pivotally connected to the corresponding end of the companion axle at a point normally above said pivotal connection with said lever and permitting lateral movement of each of said axles independent of the corresponding levers; a resilient compensating means rotatably secured intermediate its ends to said frame at each side thereof adjacent said axles; and means connecting the opposite ends of each of said resilient compensating means with the adjacent pair of said levers.

16. A tandem axle spring suspension comprising: a frame; two axles each having wheels journaled thereon; a lever fulcrumed on said frame adjacent each end of each of said axles and normally extending in a generally horizontal direction; means pivotally connecting each of said levers to the corresponding end of the companion axle and permitting movement of each of said axles in a direction laterally of the frame; a resilient compensating means rotatably secured intermediate its ends to said frame at each side thereof adjacent said axles; and means movably connecting the opposite ends of each of said resilient compensating means with the adjacent pair of said levers at a point more than one-half the length of each lever beyond its fulcrum.

17. A tandem axle spring suspension comprising: a frame; two axles having wheels journaled thereon; a lever fulcrumed on said frame adjacent each side thereof and adjacent each end of said axles and the pivotal connection between each lever and the frame being arranged inside of the frame and the said levers projecting normally outward under said frame to the exterior thereof; a link pivotally connected to the outer end of each of said levers and pivotally connected to the corresponding end of the companion axle at a point normally above said pivotal connection with said lever; a resilient compensating means rotatably secured intermediate its ends to said frame at each side thereof adjacent said axles; and means movably connecting the opposite ends of each of said resilient compensating means with the adjacent pair of said levers at a point more than two-thirds the length of each lever beyond its fulcrum.

18. A tandem axle spring suspension comprising: a vehicle frame having main side members; a pair of brackets secured to each of said side members and extending downwardly and inwardly therefrom; two axles having wheels journaled thereon; a lever pivoted to the lower end of each of said brackets and normally extending outwardly therefrom beyond said side members; a link pivotally connected to the outer end of each of said levers and pivotally connected to the corresponding end of the companion axle at a point normally above said pivotal connection with said lever; a resilient compensating means rotatably secured intermediate its ends to said frame at each side thereof adjacent said axles; and means movably connecting the opposite ends of each of said resilient compensating means with the adjacent pair of said levers at a point more than two-thirds the length of each lever beyond its fulcrum.

19. A tandem axle vehicle spring suspension comprising: a frame; two axles each having wheels journaled thereon; a lever arranged adjacent each end of said axles and normally extending in a generally horizontal direction; a plurality of bearings for each of said levers mounted on said frame, the axes of said bearings extending longitudinally of the vehicle and said plurality of bearings being spaced a substantial distance from one another longitudinally of the vehicle; a pair of shackles spaced from one another lengthwise of the vehicle and connecting each end of each axle with the outer part of the corresponding lever, said shackles extending upwardly from said levers to said axle and said bearings and shackles being so spaced as to resist all brake and drive torque; a resilient compensating means rotatably secured intermediate its ends to said frame at each side thereof adjacent said axles; and means movably connecting the opposite ends of each of said resilient compensating means with the adjacent pair of said levers at a point more than two-thirds the length of each lever beyond its fulcrum.

20. A tandem axle vehicle spring suspension comprising: a frame; two axles each having wheels journaled thereon; a lever arranged adjacent each of said axles and normally extending in a generally horizontal direction; a plurality of bearings for each of said levers mounted on said frame; the axes of said bearings extending longitudinally of the vehicle and said plurality of bearings being spaced a substantial distance from one another longitudinally of the vehicle; a pair of shackles spaced from one another lengthwise of the vehicle and connecting each end of each axle with the outer part of the corresponding lever, each of said pair of shackles extending upwardly from the corresponding lever to the end of the adjacent axle; a resilient compensating means rotatably secured intermediate its ends to said frame at each side thereof adjacent said axles; and means movably connecting the opposite ends of each of said resilient compensating means with the adjacent pair of said levers at a point more than two-thirds the length of each lever beyond its fulcrum, said levers, shackles and resilient means comprising the sole means for supporting the vehicle frame on said axles and resisting all brake and drive torque.

ALBERT F. HICKMAN.